(12) United States Patent
Sekiyama et al.

(10) Patent No.: US 8,709,147 B2
(45) Date of Patent: Apr. 29, 2014

(54) METHOD FOR PRODUCING AQUEOUS DISPERSION OF SURFACE-TREATED CARBON BLACK PARTICLES AND AQUEOUS DISPERSION OF SURFACE-TREATED CARBON BLACK PARTICLES

(75) Inventors: Makoto Sekiyama, Tokyo (JP); Tetsuya Saitoh, Tokyo (JP); Tomoaki Kirino, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 0 days.

(21) Appl. No.: 13/982,444

(22) PCT Filed: Mar. 9, 2012

(86) PCT No.: PCT/JP2012/056067
§ 371 (c)(1),
(2), (4) Date: Aug. 23, 2013

(87) PCT Pub. No.: WO2012/121362
PCT Pub. Date: Sep. 13, 2012

(65) Prior Publication Data
US 2014/0000488 A1 Jan. 2, 2014

(30) Foreign Application Priority Data
Mar. 10, 2011 (JP) ................. 2011-053018

(51) Int. Cl.
*C09C 1/56* (2006.01)
*C09D 17/00* (2006.01)

(52) U.S. Cl.
USPC ............................ 106/476; 106/472; 106/478

(58) Field of Classification Search
USPC .......................................... 106/472, 476, 478
See application file for complete search history.

(56) References Cited

U.S. PATENT DOCUMENTS

| 2009/0114119 | A1 | 5/2009 | Horii |
| 2009/0173252 | A1 | 7/2009 | Nakata et al. |
| 2010/0269732 | A1* | 10/2010 | Sekiyama ............. 106/31.9 |
| 2011/0253008 | A1* | 10/2011 | Sekiyama ............ 106/31.75 |

FOREIGN PATENT DOCUMENTS

| JP | 48-18186 A | 3/1973 |
| JP | 57-159856 A | 10/1982 |
| JP | 04-189877 A | 7/1992 |
| JP | 10-120958 A | 5/1998 |
| JP | 2000-309732 A | 11/2000 |
| JP | 2003-183539 A | 7/2003 |
| WO | 2007/017999 A1 | 2/2007 |
| WO | 2007/055084 A1 | 5/2007 |

OTHER PUBLICATIONS

International Search Report for PCT/JP2012/056067, Mailing Date of May 22, 2012.
Written Opinion for PCT/JP2012/056067, Mailing Date of May 22, 2012.

* cited by examiner

*Primary Examiner* — Anthony J Green
(74) *Attorney, Agent, or Firm* — Westerman, Hattori, Daniels & Adrian, LLP

(57) ABSTRACT

A method for producing a surface-treated carbon black particle aqueous dispersion that exhibits excellent blackness and dispersibility, exhibits excellent storage stability, suppresses feathering, exhibits an excellent discharge capability and rub-fastness (quick-drying capability), and suppresses metal corrosion when used in an aqueous black pigment (colorant) ink, is disclosed. The method for producing a surface-treated carbon black particle aqueous dispersion includes providing an aqueous dispersion of oxidized carbon black particles obtained by forming acidic hydroxyl groups on a surface of carbon black particles having a DBP absorption of 120 cm$^3$/100 g or more, neutralizing 5% or more and less than 50% of the acidic hydroxyl groups with a polyvalent cation, and neutralizing the remainder of the acidic hydroxyl groups with a monovalent cation.

2 Claims, No Drawings

METHOD FOR PRODUCING AQUEOUS DISPERSION OF SURFACE-TREATED CARBON BLACK PARTICLES AND AQUEOUS DISPERSION OF SURFACE-TREATED CARBON BLACK PARTICLES

TECHNICAL FIELD

The invention relates to a method for producing a surface-treated carbon black particle aqueous dispersion and a surface-treated carbon black particle aqueous dispersion.

BACKGROUND ART

It is very difficult to stably disperse carbon black in an aqueous medium at a high concentration since carbon has hydrophobicity and low wettability with water. This is because the surface of carbon black has a very small amount of hydrophilic functional groups (e.g., acidic hydroxyl groups such as a carboxyl group or a hydroxyl group) that exhibit high affinity to an aqueous medium (e.g., water molecules).

Attempts have long been made to improve the dispersibility of carbon black in water by oxidizing carbon black to form hydrophilic functional groups on the surface of the carbon black.

For example, Patent Document 1 (JP-A-48-018186) proposes a method that oxidizes carbon black using a hypohalite aqueous solution, and Patent Document 2 (JP-A-57-159856) proposes a method that oxidizes carbon black using low-temperature oxygen plasma. However, a carbon black aqueous dispersion that exhibits excellent blackness (print density) and dispersibility in water; and may suitably be used in an aqueous black pigment (colorant) ink such as an inkjet printer black ink, is still desired at present.

A method for producing an aqueous ink that attempts to improve dispersibility in water by utilizing carbon black that is subjected to a low degree of oxidation in combination with a coupling agent or a surfactant and the like, has been proposed (e.g., Patent Document 3 (JP-A-4-189877)). However, it is difficult to stably maintain the dispersibility for a long time due to oxidation or decomposition (i.e., a change in properties) of the surfactant and the like caused by a change in temperature or a change with the passage of time.

Carbon black may be surface-treated white improving dispersibility by finely grinding carbon black in water using glass beads, and oxidizing the carbon black using a hypohalite. According to this method, however, the grinding effect may be reduced due to the buoyancy acting on the glass beads in water, and it is difficult to uniformly form functional groups on the surface of the carbon black since an active site is formed to only a small extent.

RELATED-ART DOCUMENT

Patent Document

Patent Document 1: JP-A-48-018186
Patent Document 2: JP-A-57-159856
Patent Document 3: JP-A-4-189$77

SUMMARY OF THE INVENTION

Technical Problem

In view of the above situation, the inventors of the invention conceived obtaining a surface-treated carbon black particle aqueous dispersion that exhibits excellent blackness (print density) by neutralizing acidic hydroxyl groups formed on the surface of carbon black particles having a DBP (dibutyl phthalate) absorption of 120 $cm^3/100$ g or more using a monovalent cation, and a polyvalent cation having a valency of 2 or more.

The inventors conducted extensive studies, and found that blackness is improved when using oxidized carbon black particles prepared from carbon black particles having a DBP absorption of 120 $cm^3/100$ g or more in combination with a polyvalent cation, but the polyvalent cation becomes a free cation, and decreases the dispersibility of the oxidized carbon black particles.

An object of the invention is to provide a method for producing a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink, and a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink.

Solution to Problem

The inventors conducted extensive studies in order to solve the above technical problem and found that this technical problem can be solved by producing a surface-treated carbon black particle aqueous dispersion by providing an aqueous dispersion of oxidized carbon black particles obtained by forming acidic hydroxyl groups on the surface of carbon black particles having a DBP absorption of 120 $cm^3/100$ g or more, neutralizing 5% or more and less than 50% of the acidic hydroxyl groups with a polyvalent cation, and neutralizing the remainder of the acidic hydroxyl groups with a monovalent cation. This finding has led to the completion of the invention.

Specifically, several aspects of the invention provide (1) a method for producing a surface-treated carbon black particle aqueous dispersion including providing an aqueous dispersion of oxidized carbon black particles obtained by forming acidic hydroxyl groups on a surface of carbon black particles having a DBP absorption of 120 $cm^3/100$ g or more, neutralizing 5% or more and less than 50% of the acidic hydroxyl groups with a polyvalent cation, and neutralizing the remainder of the acidic hydroxyl groups with a monovalent cation, and (2) a surface-treated carbon black particle aqueous dispersion produced by providing an aqueous dispersion of oxidized carbon black particles obtained by forming acidic hydroxyl groups on a surface of carbon black particles having a DBP absorption of 120 $cm^3/100$ g or more, neutralizing 5% or more and less than 50% of the acidic hydroxyl groups with a polyvalent cation, and neutralizing the remainder of the acidic hydroxyl groups with a monovalent cation.

Advantageous Effects of the Invention

According to the aspects of the invention, by providing an aqueous dispersion of oxidized carbon black particles obtained by forming acidic hydroxyl groups on the surface of carbon black particles having a DBP absorption of 120 $cm^3/$ 100 g or more neutralizing 5% or more and less than 50% of the acidic hydroxyl groups with a polyvalent cation, and neutralizing the remainder of the acidic hydroxyl groups with a monovalent cation, the polyvalent cations and the monovalent cations can be strongly bonded to the acidic hydroxyl groups, and occurrence of free polyvalent cations can be suppressed. It is thus possible to provide a method for producing a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink, and a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink.

DESCRIPTION OF EMBODIMENTS

A method for producing a surface-treated carbon black particle aqueous dispersion according to one embodiment of the invention (hereinafter may be referred to as "production method according to one embodiment of the invention") is described below.

The method for producing a surface-treated carbon black particle aqueous dispersion according to one embodiment of the invention includes providing an aqueous dispersion of oxidized carbon black particles obtained by forming acidic hydroxyl groups on a surface of carbon black particles having a DBP absorption of 120 cm$^3$/100 g or more, neutralizing 5% or more and less than 50% of the acidic hydroxyl groups with a polyvalent cation, and neutralizing the remainder of the acidic hydroxyl groups with a monovalent cation.

The carbon black particles used for the production method according to one embodiment of the invention to produce the oxidized carbon black particles are not particularly limited. For example, furnace black particles, gas black (channel black) particles, acetylene black particles, thermal black particles, or the like may be used.

The carbon black used for the production method according to one embodiment of the invention has a DBP absorption of 120 cm$^3$/100 g or more, preferably 120 to 300 cm$^3$/100 g, and more preferably 120 to 180 cm$^3$/100 g.

When the carbon black used for the production method according to one embodiment of the invention has a DBP absorption of 120 cm$^3$/100 g or more, excellent blackness (print density) can be obtained.

Examples of the carbon black having a DBP absorption of 120 cm$^3$/100 g or more include, but are not limited to, SEAST 5H, SEAST 3H, SEAST NH, SEAST 6HM, SEAST 116, TOKABLACK 45500, TOKABLACK #4500, TOKABLACK #4400 (manufactured by Tokai Carbon Co., Ltd.); F-200, SUNBLACK270 (manufactured by Asahi Carbon Co., Ltd.); DIABLACK SA, DIABLACK N234, DIABLACK II (II SAF), DIABLACK N(N 339), DIABLACK SH (HAF), DIABLACK MA600, DIABLACK #20, DIABLACK #3050, DIABLACK #3230 (manufactured by Mitsubishi Chemical Corporation); SHOBLACK N234, SHOBLACK N339, SHOBLACK MAF, VULCAN XC72, BLACK PEARLS 480 (manufactured by Cabot); NITERON #2001S, NITERON 10 (manufactured by Nippon Steel Chemical Carbon Co., Ltd.); DENKA BLACK FX-35, DENKA BLACK HS-100 (manufactured by Denki Kagaku Kogyo Kabushiki Kaisha); Colour Black FW200, Colour Black FW2, Colour Black FW285, Colour Black FW1, Colour Black FW18, Colour Black S170, Colour Black S160, Special Black 6, Special Black 5, Special Black 4, Special Black 4A, Printex U, Printex V, Printex 140U, Printex 140V, Printex L6, Printex 3, HIBLACK 40B1, HIBLACK 40B2, HIBLACK 420B, HIBLACK 150B, Corax HP1107, Corax HP130, Corax N234, Corax N339, Corax N351, Corax MAF, Corax N550, Purex HS55, Purex HS45 (manufactured by Evonik Degussa (Orion Engineered Carbons)); Raven 820, Conductex 7055 ULTRA (manufactured by Columbian Chemicals); and the like.

Note that the term "DBP absorption" used herein refers to a value measured in accordance with "Carbon black for rubber industry—Fundamental characteristics—Part 4: Determination of oil absorption number" specified in JIS K 6217-4.

The specific surface area by nitrogen adsorption ($N_2SA$) of the carbon black used for the production method according to one embodiment of the invention is preferably 25 to 300 m$^2$/g, more preferably 100 to 300 m$^2$/g, and still more preferably 100 to 180 m$^2$/g.

Note that the term "specific surface area by nitrogen adsorption ($N_2SA$)" used herein refers to a value measured in accordance with "Carbon black for rubber industry—Fundamental characteristics—Part 2: Determination of specific surface area—Nitrogen adsorption methods—Single-point procedures" specified in JIS K 6217-2.

The iodine adsorption (IA) (iodine adsorption number) of the carbon black used for the production method according to one embodiment of the invention is preferably 25 to 300 mg/g, more preferably 100 to 300 mg/g, and still more preferably 100 to 180 mg/g.

The term "iodine adsorption (IA)" used herein refers to a value measured in accordance with "Carbon black for rubber industry—Fundamental characteristics—Part 1: Determination of iodine adsorption number (Titrimetric method)" specified in JIS K 6217-1.

The tinting strength (Tint) of the carbon black used for the production method according to one embodiment of the invention is preferably 30 to 180%, more preferably 90 to 180%, and still more preferably 100 to 150%.

The term "tinting strength (Tint)" used herein refers to a value measured in accordance with ASTM D3265.

The volume average particle size of the carbon black used for the production method according to one embodiment of the invention is preferably 30 to 250 nm, more preferably 50 to 150 nm, and still more preferably 60 to 100 nm.

When the volume average particle size of the carbon black is within the above range, the resulting surface-treated carbon black particle aqueous dispersion exhibits excellent discharge stability and blackness (print density) when used in an aqueous black pigment (colorant) ink (e.g., inkjet printer ink).

The term "volume average particle size" used herein in connection with the carbon black particles refers to the particle size at 50% (average particle size D50) in the cumulative volume particle size distribution measured using a dynamic light scattering.

The oxidized carbon black particles used for the production method according to one embodiment of the invention are obtained by forming acidic functional group on the surface of the carbon black particles.

Carbon black particles have various functional groups on the surface thereof corresponding to the production history. For example, a large amount of functional groups are present on the surface of gas black (channel black) particles as compared with furnace black particles.

In the production method according to one embodiment of the invention, when the desired amount of acidic hydroxyl groups have been formed on the surface of carbon black particles during the production process, the carbon black particles are considered to be oxidized carbon black particles. When the desired amount of acidic hydroxyl groups are not present on the surface of carbon black particles, the carbon black particles are oxidized to form the desired amount of acidic hydroxyl groups on the surface of the carbon black particles, which are then used as the oxidized carbon black particles.

The oxidized carbon black particles may be obtained by oxidizing the carbon black particles by a known method. For example, the carbon black particles may be subjected to liquid-phase oxidation by mixing the carbon black particles into an oxidizing agent aqueous solution, and stirring the mixture.

The oxidizing agent used for liquid-phase oxidation is not particularly limited. Examples of the oxidizing agent include nitric acid, sulfuric acid, chloric acid, peroxydiacids such as peroxosulfuric acid, peroxoboric acid, peroxocarbonic acid, and peroxophosphoric acid, salts thereof, and the like. Examples of the salts include salts of an alkali metal such as lithium, sodium, and potassium, or ammonium salts, and the like.

An aqueous medium is preferable as the solvent used to disperse the oxidizing agent. Examples of the aqueous medium include water and water-soluble organic solvents. It is preferable to use water (particularly deionized water) from the viewpoint of cost and safety.

The degree of liquid-phase oxidation may be controlled by adjusting the concentration of the oxidizing agent in the oxidizing agent aqueous solution, the ratio (amount) of the carbon black particles added to the oxidizing agent aqueous solution, the oxidation temperature, the oxidation time, the stirring speed, and the like.

The carbon black particles may be subjected to liquid-phase oxidation by adding (mixing) the carbon black particles to (into) the concentration-adjusted oxidizing agent aqueous solution in an appropriate quantitative ratio, and stirring the mixture at a temperature of room temperature to about 90° C. (preferably 60 to 90° C.) for 1 to 20 hours to prepare a slurry.

The carbon black particles subjected to liquid-phase oxidation may be subjected to wet oxidation or dry oxidation in advance. The carbon black particles can be efficiently dispersed in the oxidizing agent aqueous solution, and uniformly and efficiently subjected to liquid-phase oxidation by subjecting the carbon black particles to wet oxidation or dry oxidation in advance.

The carbon black particles may be subjected to wet oxidation by bringing the carbon black particles into contact with ozone water, a hydrogen peroxide solution, a persulfate, a salt thereof, or the like. The carbon black particles may be subjected to dry oxidation by exposing the carbon black particles to a gas atmosphere such as ozone, oxygen, $NO_X$, or $SO_X$.

A surfactant may be added to the oxidizing agent aqueous solution in order to uniformly disperse the carbon black particles. An anionic surfactant, a nonionic surfactant, or a cationic surfactant may be used as the surfactant.

The subsequent neutralization step can be effected smoothly and efficiently by removing reduced salts from the slurry obtained by liquid-phase oxidation after producing the oxidized carbon black by liquid-phase oxidation. The reduced salts may be removed using a separation membrane such as an ultrafiltration (UF) membrane, a reverse osmosis (RO) membrane, or an electrodialysis membrane.

The acidic hydroxyl group content in the oxidized carbon black particles used for the production method according to one embodiment of the invention is preferably 350 to 1500 µmol/g, more preferably 470 to 1150 µmol/g, and still more preferably 600 to 900 µmol/g.

When the acidic hydroxyl group content in the oxidized carbon black particles used for the production method according to one embodiment of the invention is within the above range, the oxidized carbon black particles readily exhibit excellent dispersibility in the aqueous medium.

Note that the acidic hydroxyl group content in the oxidized carbon black particles used for the production method according to one embodiment of the invention refers to the sum of the carboxyl group content and the hydroxyl group content in the oxidized carbon black particles. The acidic hydroxyl groups are important as the functional groups present on the surface of the carbon black taking account of the dispersibility of the oxidized carbon black in the aqueous medium and the like. In particular, carboxyl groups and hydroxyl groups play an important role. Therefore, the acidic hydroxyl group content in the oxidized carbon black particles may be substantially considered to be the sum of the carboxyl group content and the hydroxyl group content.

The carboxyl group content in the oxidized carbon black particles used for the production method according to one embodiment of the invention is preferably 300 to 1200 µmol/g, more preferably 400 to 900 µmol/g, and still more preferably 500 to 700 µmol/g.

The hydroxyl group content in the oxidized carbon black particles used for the production method according to one embodiment of the invention is preferably 50 to 300 µmol/g, more preferably 70 to 250 µmol/g, and still more preferably 100 to 200 µmol/g.

Note that the terms "carboxyl group content" and "hydroxyl group content" used herein in connection with the oxidized carbon black particles refer to values measured using the following methods (1) and (2), respectively.

(1) Carboxyl Group Content Measurement Method

About 2 to 5 g of the oxidized carbon black is added to a 0.976 N sodium hydrogen carbonate aqueous solution. The mixture is shaken for about 6 hours, and filtered, and the carboxyl group content in the filtrate is measured by titration.

(2) Hydroxyl Group Content Measurement Method 2,2'-Diphenyl-1-picrylhydrazyl (DPPH) is dissolved in carbon tetrachloride to prepare a $5 \times 10^{-4}$ mol/l solution. After the addition of 0.1 to 0.6 g of the oxidized carbon black to the solution, the mixture is stirred in a thermostat bath at 60° C. for 6 hours, and filtered. The filtrate is subjected to measurement using a UV absorptiometer, and the hydroxyl group content is calculated from the absorbance.

In the production method according to one embodiment of the invention, the aqueous dispersion of the oxidized carbon black particles may be prepared by purifying the oxidized carbon black on which the desired amount of acidic hydroxyl groups are formed, and dispersing the oxidized carbon black in an aqueous medium, or the dispersion obtained by oxidizing the carbon black particles may be used directly as the aqueous dispersion of the oxidized carbon black particles.

Examples of the aqueous medium include those mentioned above.

The concentration of the oxidized carbon black particles in the aqueous dispersion of the oxidized carbon black particles used for the production method according to one embodiment of the invention is preferably 0.1 to 20 mass %, more preferably 1 to 10 mass %, and still more preferably 1 to 5 mass %.

The production method according to one embodiment of the invention includes neutralizing 5% or more and less than 50% of the acidic hydroxyl groups formed on the surface of the carbon black particles with a polyvalent cation, and neutralizing the remainder of the acidic hydroxyl groups with a monovalent cation in the aqueous dispersion of the oxidized carbon black particles.

In the production method according to one embodiment of the invention, it is preferable to neutralize 5 to 45% of the acidic hydroxyl groups formed on the surface of the carbon black particles with a polyvalent cation. It is more preferable to neutralize 10 to 25% of the acidic hydroxyl groups formed on the surface of the carbon black particles with a polyvalent cation.

The degree of neutralization with a polyvalent cation may be controlled by adjusting the amount of polyvalent cations added to the reaction system with respect to the content of the acidic hydroxyl groups present on the surface of the carbon black that is measured by the above method.

According to the production method according to one embodiment of the invention, polyvalent cations can be effectively and strongly bonded to the surface of the oxidized carbon black to suppress occurrence of free cations by neutralizing 5% or more and less than 50% of the acidic hydroxyl groups present on the surface of the oxidized carbon black particles with a polyvalent cation to obtain a surface-treated carbon black particle aqueous dispersion that exhibits excellent dispersibility and blackness (print density).

Examples of the polyvalent cation include various cations that may have a valency of 2 or more. It is preferable that the polyvalent cation be a divalent cation.

Specific examples of the polyvalent cation include a beryllium ion ($Be^{2+}$), a magnesium ion ($Mg^{2+}$), a calcium ion ($Ca^{2+}$, a strontium ion ($Sr^{2+}$), a barium ion ($Ba^{2+}$), a radium ion ($Ra^{2+}$), a scandium ion ($Sc^{2+}$), a titanium ion ($Ti^{2+}$), a vanadium ion ($V^{2+}$), a chromium ion ($Cr^{2+}$), a manganese ion ($Mn^{2+}$), an iron ion ($Fe^{2+}$), a cobalt ion ($Co^{2+}$), a nickel ion ($Ni^{2+}$), a copper ion ($Cu^{2+}$), a zinc ion ($Zn^{2+}$), a gold ion ($Au^{2+}$), a cadmium ion ($Cd^{2+}$), a mercury ion ($Hg^{2+}$) a lead ion ($Pb^{2+}$), a platinum ion ($Pt^{2+}$), a boron ion ($B^{2+}$), an aluminum ion ($Al^{3+}$), a gallium ion ($Ga^{2+}$), a zirconium ion ($Zr^{4+}$), and the like.

These polyvalent cations may be used in the form of a hydroxide or a salt such as a sulfate, a carbonate, a nitrate, a hydrochloride, a phosphate, or a borate.

According to the production method according to one embodiment of the invention, the polyvalent cations function as a sizing agent in the resulting surface-treated carbon black particle aqueous dispersion, and improve blackness density) as a result of using the polyvalent cation in combination with the monovalent cation.

Examples of the monovalent cation include a sodium ion ($Na^+$), a lithium ion ($Li^+$), a potassium ion ($K^+$), a rubidium ion ($Rb^+$), a cesium ion ($Cs^+$), an ammonium ion ($NH_4^+$), and the like.

These monovalent cations are preferably used in the form of a hydroxide. These monovalent cations may be used in the form of a tetraalkylammoium hydroxide or the like.

In the production method according to one embodiment of the invention, the acidic hydroxyl groups formed on the surface of the carbon black particles are neutralized by adding the polyvalent cations to the aqueous dispersion of the oxidized carbon black particles, and then adding the monovalent cations to the aqueous dispersion of the oxidized carbon black particles. In this case, the amount of the polyvalent cations and the amount of the monovalent cations added to the aqueous dispersion of the oxidized carbon black particles are adjusted so that 5% or more and less than 50% of the acidic hydroxyl groups are neutralized with a polyvalent cation having a valency of 2 or more, and the remainder of the acidic hydroxyl groups are neutralized with the monovalent cation.

It is preferable to neutralize the acidic hydroxyl groups at a temperature of room temperature to 100° C. and a pH of 4.0 to 12.0 for 3 to 20 hours with stirring.

In the production method according to one embodiment of the invention, the acidic hydroxyl groups such as carboxyl groups and hydroxyl groups formed on the surface of the oxidized carbon black particles are thus neutralized with the polyvalent cation and the monovalent cation. In other words, the acidic hydroxyl groups such as carboxyl groups and hydroxyl groups formed on the surface of the oxidized carbon black particles are substituted with the polyvalent cation and the monovalent cation.

In the production method according to one embodiment of the invention, when divalent cations ($M^{2+}$) are added to the oxidized carbon black particles as the polyvalent cations, the carboxyl groups (—COOH) and the hydroxyl group (—OH) formed on the surface of the oxidized carbon black particles are neutralized as shown below (schematic view), for example.

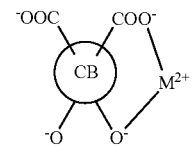

Note that "CB" is a carbon black particale.

When monovalent cations ($M^+$) are then added to the oxidized carbon black particles, the carboxyl groups (—COOH) and the hydroxyl group (—OH) formed on the surface of the oxidized carbon black particles are neutralized as shown below, for example.

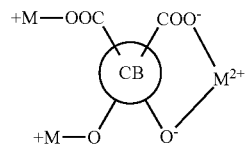

Note that "CB" is a carbon black particale.

The inventors conducted extensive studies in order to improve the dispersibility of oxidized carbon black particles. Surprisingly, the inventors found that, when polyvalent cations and monovalent cations are simultaneously added to oxidized carbon black particles, the monovalent cations are bonded to the majority of the acidic functional groups (acidic hydroxyl groups) on the surface of the oxidized carbon black particles, while the polyvalent cations become free cations due to the difference in basicity or solubility, and the polyvalent cations are bonded to the acidic hydroxyl groups of a plurality of oxidized carbon black particles, whereby the oxidized carbon black particles aggregate, and the dispersibility of the oxidized carbon black particles decreases. The inventors also found that, when monovalent hydroxides are added to the oxidized carbon black particles, and polyvalent cations are then added to the oxidized carbon black particles, the monovalent cations that have been added before the polyvalent cations are bonded to the majority of the acidic functional groups (acidic hydroxyl groups) formed on the surface of the oxidized carbon black particles, while the polyvalent cations are rarely bonded to the acidic functional groups, and become free cations, and the polyvalent cations function as an aggregating agent, and prevent an improvement in the dispersibility of the oxidized carbon black particles.

The inventors found that the above aggregating effect significantly occurs when using oxidized carbon black prepared using carbon black having a DBP absorption of 120 cm$^3$/100 g or more.

It is conjectured that blackness (print density) is improved when using oxidized carbon black prepared using carbon black having a DBP absorption of 120 cm$^3$/100 g or more, but the free cations are easily bonded to the acidic hydroxyl groups of a plurality of oxidized carbon black particles due to a decrease in the distance between the oxidized carbon black particles, and the oxidized carbon black particles easily aggregate.

The inventors conducted further extensive studies based on the above findings. As a result, the inventors found that, when adding a specific amount of polyvalent cations to an aqueous dispersion of oxidized carbon black particles formed using carbon black having a DBP absorption of 120 cm$^3$/100 g or more, and adding monovalent cations to the aqueous dispersion to neutralize the acidic hydroxyl groups present on the surface of the carbon black particles, the polyvalent cations that have been added before the monovalent cations are strongly bonded to the acidic hydroxyl groups present on the surface of the oxidized carbon black particles, and rarely become free cations, and the remainder of the acidic hydroxyl groups are neutralized with the monovalent cations to produce a surface-treated carbon black particle aqueous dispersion that exhibits excellent blackness (print density) and dispersibility. The above findings have led to the completion of the invention.

The surface-treated carbon black particles included in the aqueous dispersion obtained by the production method according to one embodiment of the invention have a structure in which polyvalent cations are strongly bonded to the surface of the oxidized carbon black particles. Therefore, when the aqueous dispersion is used in an aqueous ink or the like, the polyvalent cations function as a sizing agent on the surface of paper during printing, and improve the print density.

In the production method according to one embodiment of the invention, it is preferable to remove salts produced by neutralization since such salts may impair the dispersibility of the surface-treated carbon black particles obtained through neutralization. It is also effective to remove salts produced by neutralization in order to suppress reaggregation of the surface-treated carbon black particles in the aqueous dispersion.

It is preferable to remove salts produced by neutralization (i.e., purification) using a separation membrane such as an ultrafiltration (UF) membrane, a reverse osmosis (RO) membrane, or an electrodialysis membrane. It is preferable to remove salts produced by neutralization (i.e., purification) to such an extent that the electrical conductivity of the aqueous dispersion is 5 mS/cm or less when the concentration of the surface-treated carbon black particles is 20 mass %, for example.

When undispersed aggregates or large particles are present in the aqueous dispersion after neutralization, it is preferable to remove such undispersed aggregates or large particles through classification by centrifugation, filtration, or the like. When such undispersed aggregates or large particles are not removed, a nozzle may be clogged when using the aqueous dispersion as an inkjet printer aqueous black ink, for example.

It is preferable to disintegrate (atomize) secondary aggregates of the carbon black particles included in the aqueous dispersion from which salts have been removed (i.e., purified) and which has optionally been subjected to classification.

The secondary aggregates may be disintegrated by discharging the resulting aqueous dispersion from a nozzle under pressure, and causing the discharged streams to collide, or discharging the aqueous dispersion toward a wall surface at a high speed so that a collision (impact) force or a shear force occurs.

Examples of a disintegrator that may be used for disintegration include a Microfluidizer manufactured by Microfluidics, an Ultimizer manufactured by Sugino Machine Ltd., a Nanomizer manufactured by Tokai Corporation, a high-pressure homogenizer, and the like.

It is preferable to perform disintegration by discharging the aqueous dispersion from a jet nozzle under a pressure of 50 to 250 MPa so that the maximum particle size of the aggregates is 1 μm or less.

Note that classification of large particles or disintegration of secondary aggregates may be performed after adding the polyvalent cations and the monovalent cations to the dispersion of the oxidized carbon black particles to effect neutralization, but before removing salts (purification).

A surface-treated carbon black particle aqueous dispersion can thus be produced by the production method according to one embodiment of the invention.

The concentration of the surface-treated carbon black particles in the aqueous dispersion produced by the production method according to one embodiment of the invention is preferably 0.1 to 60 mass %, more preferably 0.1 to 25 mass %, and still more preferably 10 to 25 mass %.

The surface-treated carbon black particle aqueous dispersion produced by the production method according to one embodiment of the invention includes a significantly reduced amount of free (polyvalent) cations. For example, when the aqueous dispersion includes the surface-treated carbon black particles at a concentration of 10 mass %, the amount of free (polyvalent) cations can be reduced to 10 ppm by mass or less, preferably 8 ppm by mass or less, and more preferably 5 ppm by mass or less.

The surface-treated carbon black particle aqueous dispersion produced by the production method according to one embodiment of the invention can improve the optical density (OD) (i.e., print density) to 1.40 or more, preferably 1.45 or more, and more preferably 1.50 or more.

When using the surface-treated carbon black particle aqueous dispersion produced by the production method according to one embodiment of the invention as an inkjet printer aqueous black ink or the like, the surface-treated carbon black particle aqueous dispersion may optionally be purified and concentrated.

For example, the aqueous medium may be added or removed so that the carbon black particle concentration (e.g., 0.1 to 20 mass %) suitable for an aqueous black pigment (colorant) ink is obtained, and an ink additive such as a preservative, a viscosity controller, or a resin may optionally be added to the surface-treated carbon black particle aqueous dispersion to prepare an aqueous black pigment (colorant) ink.

The embodiments of the invention thus provide a method for producing a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink.

A surface-treated carbon black particle aqueous dispersion according to one embodiment of the invention is described below.

The surface-treated carbon black particle aqueous dispersion according to one embodiment of the invention is produced by providing an aqueous dispersion of oxidized carbon black particles obtained by forming acidic hydroxyl groups on a surface of carbon black particles having a DBP absorption of 120 cm³/100 g or more, neutralizing 5% or more and less than 50% of the acidic hydroxyl groups with a polyvalent cation, and neutralizing the remainder of the acidic hydroxyl groups with a monovalent cation.

Examples of the oxidized carbon black particles and the aqueous dispersion thereof used to produce the surface-treated carbon black particle aqueous dispersion according to one embodiment of the invention include those mentioned above.

Examples of the polyvalent cation and the monovalent cation used to produce the surface-treated carbon black particle aqueous dispersion according to one embodiment of the invention include those mentioned above. The degree of neutralization and the like may be the same as described above.

It is preferable to produce the surface-treated carbon black particle aqueous dispersion according to one embodiment of the invention using the production method according to one embodiment of the invention. The concentration, the properties, and the like of the resulting surface-treated carbon black particle aqueous dispersion may preferably be the same as described above.

The embodiments of the invention thus provide a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink.

The invention is further described below by way of examples. Note that the invention is not limited to the following examples.

EXAMPLES

The invention is further described below by way of examples. Note that the invention is not limited to the following examples.

Example 1

(1) 150 g of carbon black A (DBP absorption: 124 cm³/100 g, specific surface area by nitrogen adsorption ($N_2SA$): 145 m²/g, iodine adsorption (IA): 135 mg/g, tinting strength (Tint): 135%, average particle size: 64 nm) was added to 3000 ml of an ammonium persulfate aqueous solution (concentration: 2.0 N), and subjected to liquid-phase oxidation at 60° C. for 10 hours with stirring (rotational speed: 300 rpm). After removing reduced salts from the resulting slurry using an ultrafiltration membrane ("AHP-1010" manufactured by Asahi Kasei Corporation, molecular weight cutoff: 50,000), the slurry was filtered to obtain an oxidized carbon black particle aqueous dispersion.

The carboxyl group content and the hydroxyl group content in the oxidized carbon black particles were determined in order to determine the acidic hydroxyl group content in the oxidized carbon black particles. The carboxyl group content and the hydroxyl group content were found to be 400 µmol/g and 200 µmol/g, respectively.

(2) Calcium hydroxide was added to the slurry of the oxidized carbon black particles, and the mixture was heated at 100° C. for 2 hours to effect neutralization.

Calcium hydroxide was added in an amount of 7 µmol/g (based on calcium), by which 40% of the acidic hydroxyl groups present on the surface of the carbon black could be neutralized.

(3) Potassium hydroxide was added to the mixture, and the mixture was heated at 100° C. for 2 hours to effect neutralization.

Potassium hydroxide was added in an amount of 20 µmol/g (based on potassium), by which 60% of the acidic hydroxyl groups present on the surface of the carbon black could be neutralized.

After completion of neutralization with potassium hydroxide, the resulting slurry was filtered using an ultrafiltration membrane ("AHP-1010" manufactured by Asahi Kasei Corporation, molecular weight cutoff: 50,000) to remove the residual salts and effect concentration to obtain a surface-treated carbon black aqueous dispersion having a concentration of 20 mass %.

The electrical conductivity of the aqueous dispersion was 0.6 mS/cm.

The viscosity, the particle size (average particle size Dupa50% and maximum particle size Dupa99%), the print density (optical density (OD)), and the free divalent cation concentration (free calcium ion concentration) of the surface-treated carbon black aqueous dispersion were evaluated by the following methods. The results are shown in Table 1.

Measurement of Viscosity

An airtight container was charged with part of the surface-treated carbon black aqueous dispersion having a concentration of 20 mass %. The aqueous dispersion (container) was maintained at 70° C. to measure the initial viscosity and the viscosity after 4 weeks using a viscometer ("TV-20" manufactured by Toki Sangyo Co., Ltd.).

Measurement of Particle Size

The concentration of part of the surface-treated carbon black aqueous dispersion was adjusted to 0.1 to 0.5 kg/cm³, and the particle size of the surface-treated carbon black particles was measured using a heterodyne laser Doppler-type particle size distribution analyzer ("UPA model 9340" manufactured by Microtrac) to draw a cumulative frequency distribution curve. The value at a cumulative frequency of 50% in the cumulative frequency distribution curve was determined to the average particle size (Dupa50%) of the surface-treated carbon black particles, and the value at a cumulative frequency of 99% was determined to the maximum particle size (Dupa99%) of the surface-treated carbon black particles.

The average particle size and the maximum particle size were also measured using the surface-treated carbon black aqueous dispersion that had been stored at 70° C. for 4 weeks, and subjected to viscosity measurement.

Measurement of Print Density (OD)

Part of the surface-treated carbon black aqueous dispersion having a concentration of 20 mass % was filtered using a membrane filter having a pore size of 0.8 µm, and put in an ink cartridge of an inkjet printer "EM-930C" (manufactured by Seiko Epson Corporation), and alphanumeric characters were printed on plain paper (Xerox 4024 paper).

After allowing the plain paper subjected to printing to stand for 1 hour or more, the optical density was measured using an optical density meter (X-Rite 504), and taken as the print density.

Measurement of Free Divalent Cation Concentration

Part of the surface-treated carbon black aqueous dispersion having a concentration of 20 mass % was diluted with purified water to obtain a surface-treated carbon black aqueous dispersion having a concentration of 10 mass %, and solids were separated using an ultrafiltration system ("Vivaspin 20 (VS2032)" manufactured by Sartorius, molecular weight cutoff: 50,000) that utilizes centrifugal force. The components of the solid were analyzed using an ICP emission spectrometer ("SPS7800" manufactured by Seiko Instruments, Inc.) to measure the free divalent cation concentration.

Example 2

A surface-treated carbon black aqueous dispersion having a concentration of 20 mass % was obtained in the same manner as in Example 1, except that an oxidized carbon black particle aqueous dispersion was obtained in the same manner as in the step (1) in Example 1, calcium hydroxide was added in an amount of 3 μmol/g (based on calcium), by which 20% of the acidic hydroxyl groups present on the surface of the carbon black could be neutralized, and the mixture was heated at 100° C. for 2 hours to effect neutralization (corresponding to the step (2) in Example 1), potassium hydroxide was added in an amount of 40 μmol/g (based on potassium), by which 80% of the acidic hydroxyl groups present on the surface of the carbon black could be neutralized, and the mixture was heated at 100° C. for 2 hours to effect neutralization (corresponding to the step (3) in Example 1).

The viscosity, the particle size (average particle size Dupa50% and maximum particle size Dupa99%), the print density (OD), and the free divalent cation concentration of the surface-treated carbon black aqueous dispersion having a concentration of 20 mass % were evaluated in the same manner as in Example 1. The results are shown in Table 1.

Comparative Example 1

A surface-treated carbon black aqueous dispersion having a concentration of 20 mass % was obtained in the same manner as in Example 1, except that carbon black B ("SEAST 9" manufactured by Tokai Carbon Co., Ltd., DBP absorption: 115 cm$^3$/100 g, specific surface area by nitrogen adsorption ($N_4SA$): 142 m$^2$/g, iodine adsorption (IA): 139 mg/g, tinting strength (Tint): 129%, average particle size: 67 nm) was used instead of the carbon black A (corresponding to the step (1) in Example 1), and calcium hydroxide and potassium hydroxide were added at the same time (corresponding to the steps (2) and (3) in Example 1).

The viscosity, the particle size (average particle size Dupa50% and maximum particle size Dupa99%), the print density (OD), and the free divalent cation concentration of the surface-treated carbon black aqueous dispersion having a concentration of 20 mass % were evaluated in the same manner as in Example 1. The results are shown in Table 1.

Comparative Example 2

A surface-treated carbon black aqueous dispersion having a concentration of 20 mass % was obtained in the same manner as in Example 1, except that carbon black B ("SEAST 9" manufactured by Tokai Carbon Co., Ltd., DBP absorption: 115 cm$^3$/100 g, specific surface area by nitrogen adsorption ($N_2SA$): 142 m$^2$/g, iodine adsorption (IA): 139 mg/g, tinting strength (Tint): 129%, average particle size: 67 nm) was used instead of the carbon black A (corresponding to the step (1) in Example 1), and calcium hydroxide in an amount of 3 μmol/g (based on calcium), by which 20% of the acidic hydroxyl groups present on the surface of the carbon black could be neutralized, and potassium hydroxide in an amount of 40 μmol/g (based on potassium), by which 80% of the acidic hydroxyl groups present on the surface of the carbon black could be neutralized, were added at the same time, and the mixture was heated at 100° C. for 2 hours to effect neutralization (corresponding to the steps (2) and (3) in Example 1).

The viscosity, the particle size (average particle size Dupa500% and maximum particle size Dupa99%), the print density (OD), and the free divalent cation concentration of the surface-treated carbon black aqueous dispersion having a concentration of 20 mass % were evaluated in the same manner as in Example 1. The results are shown in Table 1.

TABLE 1

| | | Example 1 | Example 2 | Comparative Example 1 | Comparative Example 2 |
|---|---|---|---|---|---|
| Acidic hydroxyl group substitution ratio (%) | Calcium | 40 | 20 | 40 | 20 |
| | Potassium | 60 | 80 | 60 | 80 |
| Viscosity (mPas) | Initial | 6.85 | 6.72 | 6.74 | 6.57 |
| | After 4 weeks at 70° C. | 5.95 | 5.97 | 5.87 | 5.94 |
| Dupa50% (nm) | Initial | 145 | 142 | 143 | 147 |
| | After 4 weeks at 70° C. | 143 | 140 | 141 | 143 |
| Dupa99% (nm) | Initial | 335 | 331 | 332 | 339 |
| | After 4 weeks at 70° C. | 325 | 328 | 321 | 329 |
| Print density (OD) | | 1.52 | 1.51 | 1.49 | 1.47 |
| Free calcium ion concentration (ppm by mass) | | 4.9 | 3.8 | 37.2 | 18.9 |

Comparative Example 3

150 g of carbon black ("SEAST 9" manufactured by Tokai Carbon Co., Ltd., DBP absorption: 115 cm$^3$/100 g) was added to 3000 ml of an ammonium persulfate aqueous solution (concentration: 2.0 N), and subjected to liquid-phase oxidation at 60° C. for 10 hours with stirring (rotational speed: 300 rpm). After removing reduced salts from the resulting slurry using an ultrafiltration membrane ("AHP-1010" manufactured by Asahi Kasei Corporation, molecular weight cutoff: 50,000), the slurry was filtered to obtain oxidized carbon black.

The carboxyl group content and the hydroxyl group content in the oxidized carbon black were determined in order to determine the acidic hydroxyl group content in the oxidized carbon black. The carboxyl group content and the hydroxyl group content were found to be 400 μmol/g and 200 μmol/g, respectively.

Next, sodium hydroxide was added to the slurry of the oxidized carbon black to effect neutralization. After completion of neutralization, the carbon black slurry was filtered using an ultrafiltration membrane ("AHP-1010" manufactured by Asahi Kasei Corporation, molecular weight cutoff: 50,000) to remove the residual salts and effect concentration to obtain a carbon black aqueous dispersion (carbon black concentration: 20 mass %). The electrical conductivity of the aqueous dispersion was 0.6 mS/cm.

The viscosity and the particle size (average particle size Dupa50% and maximum particle size Dupa99%) of the surface-treated carbon black aqueous dispersion having a concentration of 20 mass % were measured in the same manner as in Example 1 in order to evaluate the aqueous dispersion. The print density (OD) of the surface-treated carbon black aqueous dispersion having a concentration of 20 mass % was measured by the following method in order to evaluate the aqueous dispersion.

Print density (OD): An ink prepared using the formulation shown in Table 2 was filtered using a membrane filter having a pore size of 0.8 μm, and put in an ink cartridge of an inkjet printer "IP3100" (manufactured by Canon Inc.), and alphanumeric characters were printed on plain paper (Xerox 4024 paper). After allowing the plain paper subjected to printing to stand for 1 hour or more, the optical density was measured using a Macbeth densitometer ("RD-927" manufactured by Kollmorgen), and taken as the print density.

TABLE 2

|  | mass % |
|---|---|
| Carbon black aqueous dispersion | 40.0 |
| Water-soluble organic solvent (glycerol) | 6.0 |
| Surfactant (Acetylenol EH) | 0.2 |
| Diethylene glycol | 6.0 |
| Trimethylolpropane | 6.0 |
| Ultrapure water | 41.8 |

The results obtained in Comparative Example 3 are shown in Table 3.

Comparative Example 4

A carbon black aqueous dispersion (carbon black concentration: 20 mass %) was produced in the same manner as in Comparative Example 3, except that neutralization was effected using magnesium hydroxide instead of sodium hydroxide. The electrical conductivity of the aqueous dispersion was 0.6 mS/cm.

The viscosity and the particle size (average particle size Dupa50% and maximum particle size Dupa99%) of the surface-treated carbon black aqueous dispersion having a concentration of 20 mass % were measured in the same manner as in Comparative Example 3 in order to evaluate the aqueous dispersion. The results are shown in Table 3.

TABLE 3

|  |  | Comparative Example 3 | Comparative Example 4 |
|---|---|---|---|
| Acidic hydroxyl group substitution ratio (%) | Magnesium | 0 | 100 |
|  | Sodium | 100 | 0 |
| Viscosity (mPas) | Initial | 6.41 | 6.47 |
|  | After 4 weeks at 70° C. | 5.36 | Gelled |
| Dupa50% (nm) | Initial | 145 | 141 |
|  | After 4 weeks at 70° C. | 143 | Gelled |
| Dupa99% (nm) | Initial | 324 | 325 |
|  | After 4 weeks at 70° C. | 315 | Gelled |
| Print density (OD) |  | 1.42 | — |

As is clear from the results shown in Table 1, the surface-treated carbon black aqueous dispersions obtained in Examples 1 and 2 showed only a small change in viscosity and particle size (average particle size Dupa50% and maximum particle size Dupa99%) during heating at 70° C. for 4 weeks, and exhibited excellent dispersion stability. The surface-treated carbon black aqueous dispersions obtained in Examples 1 and 2 achieved a high print density (OD) of 1.51 to 1.52, and exhibited excellent blackness. It is conjectured that the above results were obtained because the free calcium cation concentration was as low as 3.8 to 4.9 ppm by mass (see Table 1).

In contrast, as is clear from the results shown in Table 1, the surface-treated carbon black aqueous dispersions obtained in Comparative Examples 1 and 2 in which calcium hydroxide and potassium hydroxide were added at the same time, had a high free calcium cation concentration of 18.9 to 37.2 ppm by mass. Since the surface-treated carbon black aqueous dispersions obtained in Comparative Examples 1 and 2 were produced using carbon black having a low DBP absorption of 115 cm$^3$/100 g, the surface-treated carbon black aqueous dispersions obtained in Comparative Examples 1 and 2 achieved a low print density (OD) of 1.47 to 1.49 (i.e., achieved poor optical density).

As is clear from the results shown in Table 3, the surface-treated carbon black aqueous dispersion obtained in Comparative Example 3 in which neutralization was effected using only sodium hydroxide, and carbon black having a low DBP absorption of 115 cm$^3$/100 g was used, achieved a low print density (OD) of 1.42 (i.e., achieved poor optical density).

As is clear from the results shown in Table 3, the surface-treated carbon black aqueous dispersion obtained in Comparative Example 4 in which neutralization was effected using only magnesium hydroxide, underwent gelation when stored at 70° C. for 4 weeks (i.e., exhibited poor dispersion stability).

Preparation of Inkjet Recording Ink

Purified water was added to the surface-treated carbon black aqueous dispersion having a concentration of 20 mass % obtained in Example 1 to prepare a surface-treated carbon black aqueous dispersion having a concentration of 10 mass %, and glycerol, diethylene glycol monobutyl ether, acetyl glycol, benzotriazole, a preservative ("Proxel XL-2" manufactured by Avecia), and triethanolamine were added to the surface-treated carbon black aqueous dispersion in the ratio shown in Table 4 to obtain an inkjet printer aqueous ink 1.

An inkjet printer aqueous ink 2 having the composition shown in Table 4 was prepared using the surface-treated carbon black aqueous dispersion having a concentration of 20 mass % obtained in Example 2, a comparative inkjet printer aqueous ink 1 having the composition shown in Table 4 was prepared using the surface-treated carbon black aqueous dispersion having a concentration of 20 mass % obtained in Comparative Example 1, and a comparative inkjet printer aqueous ink 2 having the composition shown in Table 4 was prepared using the surface-treated carbon black aqueous dispersion having a concentration of 20 mass % obtained in Comparative Example 2.

TABLE 4

|  | mass % |
|---|---|
| Surface-treated carbon black particles (solid content) | 6.00 |
| Glycerol | 14.00 |
| Diethylene glycol monobutyl ether | 5.00 |
| Acetyl glycol | 1.00 |
| Benzotriazole | 0.02 |
| Preservative (Proxel XL-2) | 0.03 |
| Triethanolamine | 0.80 |
| Water | 73.15 |
| Total | 100.00 |

Feathering, the discharge capability, rubfastness (quick-drying capability), and metal corrosiveness were evaluated by the following methods using the inkjet printer aqueous ink 1, the inkjet printer aqueous ink 2, the comparative inkjet printer aqueous ink 1, and the comparative inkjet printer aqueous ink 2. The results are shown in Table 5.

Evaluation of Feathering

Each aqueous ink was put in an ink cartridge of an inkjet printer ("EM-930C" manufactured by Seiko Epson Corporation), and alphanumeric characters were printed on plain paper (Xerox 4024 paper). After allowing the plain paper subjected to printing to stand for 1 hour or more, the sharpness of the characters and feathering from the characters were observed using a microscope and with the naked eye, and the effects on the image were evaluated according to the following standard.

Acceptable: The characters were sharp, and almost no feathering was observed.
Fair: The characters were sharp, but some inconspicuous feathering was observed.
Unacceptable: The characters were not sharp, and significant feathering was observed (i.e., the aqueous ink is not suitable for practical applications).

Discharge Capability

Each aqueous ink was put in an ink cartridge of an inkjet printer ("EM-930C" manufactured by Seiko Epson Corporation), and alphanumeric characters were printed on plain paper (Xerox 4024 paper) to evaluate the discharge stability and the discharge response.

The discharge stability was evaluated by continuously discharging the aqueous ink for 24 hours at 5° C., 20° C., or 40° C., and then determining whether or not the aqueous ink could be discharged (jetted). The discharge response was evaluated by intermittently discharging the aqueous ink for 1 minute 100 times, allowing the aqueous ink to stand for 2 months after an arbitrary discharge operation among the 100 intermittent discharge operations, and then determining whether or not the aqueous ink could be discharged (jetted) again.

A case where the discharge stability and the discharge response were good (i.e., the aqueous ink could be discharged well), and characters could be printed in a state in which the end of the inkjet head was not clogged, was evaluated as "Acceptable", otherwise the discharge stability and the discharge response were evaluated as "Unacceptable".

Rubfastness (Quick-Drying Capability)

Each aqueous ink was put in an ink cartridge of an inkjet printer ("EM-930C" manufactured by Seiko Epson Corporation), and alphanumeric characters were printed on plain paper (Xerox 4024 paper). After allowing the plain paper subjected to printing for a given time, the same type of plain paper (white) was placed on the printed matter, and the printed matter was quickly removed in a state in which a smooth weight (100 g) was placed on the plain paper.

The time required for the printed area of the removed printed matter to show no stains was measured, and evaluated according to the following standard.

Acceptable: 15 seconds or less
Unacceptable: 16 seconds or more

Metal Corrosiveness

A piece made of an iron-nickel alloy that is used as the raw material for producing a metal member provided in an ink feed path was immersed in each aqueous ink, and allowed to stand at 60° C. for 2 hours. The surface of the alloy piece was observed with the naked eye before and after allowing the alloy piece to stand in each aqueous ink, and the degree of corrosion was evaluated according to the following standard.

Acceptable: The surface of the alloy piece was not corroded, or only a slight change in color was observed.
Unacceptable: The surface of the alloy piece was corroded.

TABLE 5

|  | Aqueous ink 1 | Aqueous ink 2 | Comparative aqueous ink 1 | Comparative aqueous ink 2 |
|---|---|---|---|---|
| Feathering | Acceptable | Acceptable | Fair | Fair |
| Discharge capability | Acceptable | Acceptable | Unacceptable | Unacceptable |
| Rubfastness (quick-drying capability) | Acceptable | Acceptable | Acceptable | Acceptable |
| Metal corrosiveness | Acceptable | Acceptable | Acceptable | Acceptable |

As shown in Table 5, the aqueous inks 1 and 2 respectively prepared using the surface-treated carbon black particle aqueous dispersion obtained in Examples 1 and 2 showed almost no feathering, exhibited an excellent discharge capability and rubfastness, and exhibited low metal corrosiveness. Therefore, the aqueous inks 1 and 2 can suitably be used as an aqueous black pigment (colorant) ink such as an inkjet printer aqueous ink.

In contrast, the comparative aqueous inks 1 and 2 respectively prepared using the surface-treated carbon black particle aqueous dispersion obtained in Comparative Examples 1 and 2 showed feathering, and exhibited a poor discharge capability.

INDUSTRIAL APPLICABILITY

The embodiments of the invention thus provide a method for producing a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink, and a surface-treated carbon black particle aqueous dispersion that exhibits excellent blackness and dispersibility, exhibits excellent storage stability, suppresses feathering, exhibits an excellent discharge capability and rubfastness (quick-drying capability), and suppresses metal corrosion when used in an aqueous black pigment (colorant) ink.

The invention claimed is:

1. A method for producing a surface-treated carbon black particle aqueous dispersion comprising providing an aqueous dispersion of oxidized carbon black particles obtained by forming acidic hydroxyl groups on a surface of carbon black particles having a DBP absorption of 120 cm$^3$/100 g or more, neutralizing 5% or more and less than 50% of the acidic hydroxyl groups with a polyvalent cation, and neutralizing the remainder of the acidic hydroxyl groups with a monovalent cation.

2. A surface-treated carbon black particle aqueous dispersion produced by providing an aqueous dispersion of oxidized carbon black particles obtained by forming acidic hydroxyl groups on a surface of carbon black particles having a DBP absorption of 120 cm$^3$/100 g or more, neutralizing 5% or more and less than 50% of the acidic hydroxyl groups with a polyvalent cation, and neutralizing the remainder of the acidic hydroxyl groups with a monovalent cation.

* * * * *